United States Patent Office 3,175,320
Patented Mar. 30, 1965

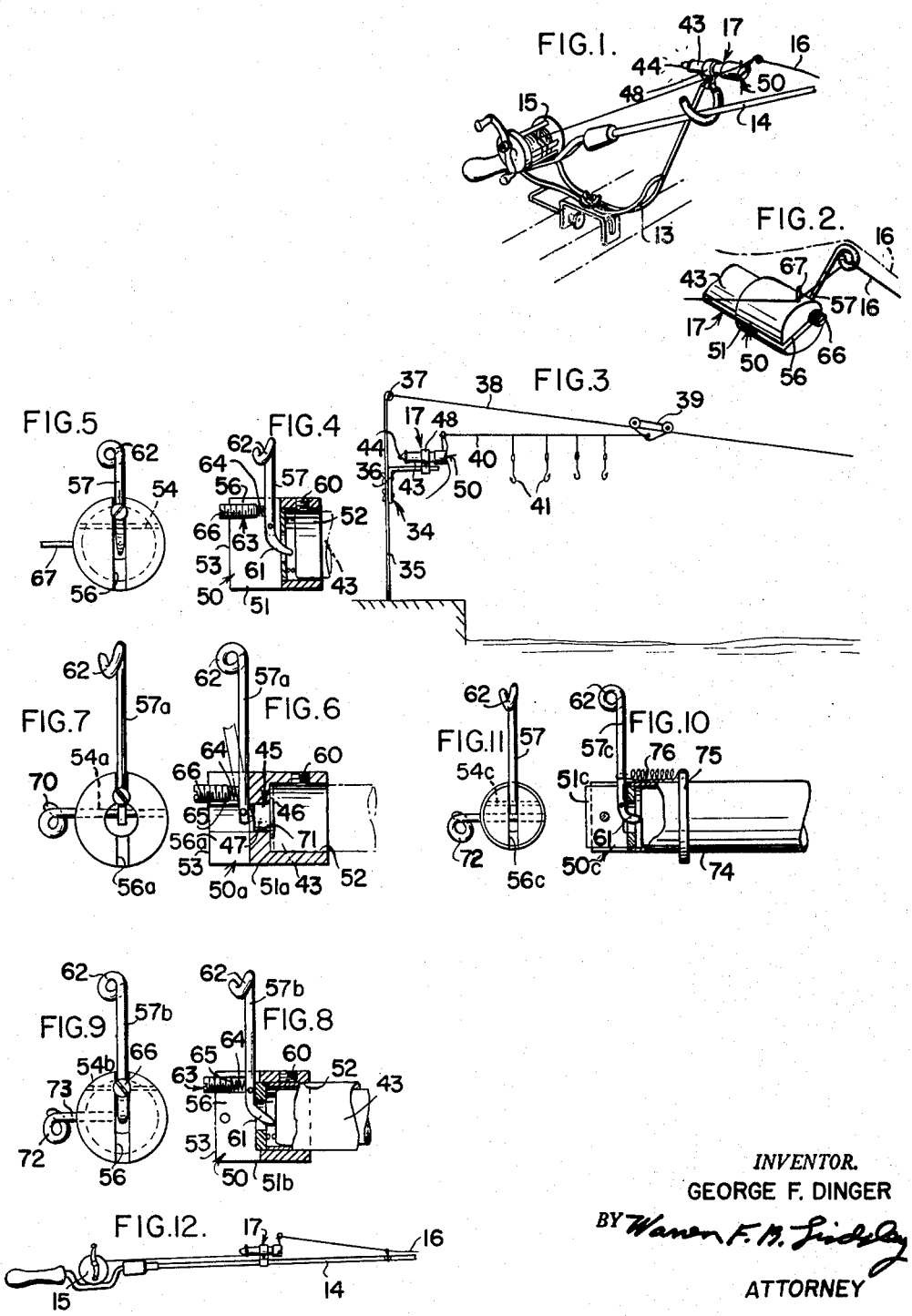

3,175,320
ADAPTOR FOR CONNECTING A FLASHLIGHT
TO A FISHING LINE
George F. Dinger, 3612 S. 43rd St., Milwaukee 20, Wis.
Filed May 1, 1961, Ser. No. 106,724
1 Claim. (Cl. 43—17)

This invention relates to fishing tackle and more particularly to a line operated fishing signal.

Line operated fishing signals for use on fishing rods or bobbers have been known, however, some of the known structures for fishing lines are relatively heavy, bulky, complicated mechanisms which are difficult to use and keep in proper adjustment. Sensitive adjustments for varying conditions of current, wind and temperature are difficult to perform or impossible to accomplish on the prior art structures. Some need may exist for a simple adaptor for use on commercially available battery casings with their built in switching mechanisms which may be readily attached to or used on fishing rods or on any of the variety of types of ice fishing tip ups, trolley lines or rod holders.

In accordance with the invention claimed a new and improved adaptor is provided for use with fishing rods, lines or any of the variety of line or rod holding structure now used for fishing. This adaptor comprises a cylindrical member that is hollow at one end only for receiving the switch end of a battery casing therein. The other end of the member is slotted and communicates at a point along the slot with the hollow interior of the one end of the member. A pin is mounted in the slotted end of the member and arranged to extend across the slot. A lever arm is pivotally mounted on the pin and arranged at one end to engage the switch end of the battery casing within the hollow end of the member and arranged at the other end to extend out of the slot. The end of the lever arm extending out of the slot is provided with means for receiving a fishing line. Means are also provided for biasing the lever arm against movement in a switch engaging direction to control the force necessary for switch actuation.

It is, therefore, one object of this invention to provide a new and improved line operated fish signalling device.

Another object of this invention is to provide a new and improved simple, compact adaptor for use with a fishing line for triggering the switch of a battery casing to actuate a signal.

A further object of this invention is to provide a new and improved small, simple adaptor for fitting over only the ends of commercially available switch actuated battery casings in which a lever arm for engaging a fishing line at one end actuates the switch of the battery casing at the other end.

A still further object of this invention is to provide a new and improved adaptor for fishing lines in which a lever arm for engaging a fishing line at one end and actuating a switch at the other end is arranged to pivotally move in a slot in said one end of the adaptor.

A still further object of this invention is to provide a new and improved adaptor for fishing lines which because of its lever arm arrangement is highly sensitive to fish biting at the end of the line but is protected against variations in wind.

A still further object of this invention is to provide a new and improved signalling device which can be readily applied to fishing rods, tip ups, trolley lines, pole holders or the like and to switch actuated battery casings with a minimum of effort.

A still further object of this invention is to provide a new and improved small compact adaptor made out of a minimum number of parts.

Objects and advantages other than those set forth will be apparent from the following description when read in connection with the accompanying drawing, in which:

FIG. 1 is a perspective view of an adaptor mounted on a fishing pole holder and interconnecting a fishing line and a signalling device and embodying the invention;

FIG. 2 is a partial enlarged perspective view of the adaptor and flashlight casing shown in FIG. 1 and illustrating how the fishing line and rod may be readily disengaged from the adaptor;

FIG. 3 is a cross sectional view partly in elevation of the adaptor shown in FIGS. 1 and 2 as mounted on a trolley arrangement;

FIG. 4 is an enlarged cross sectional view of the adaptor shown in FIGS. 1 and 2 with the lever arm pivotally mounted in a slot and having a finger switch engaging extension at one end;

FIG. 5 is a right end view of the structure shown in FIG. 4;

FIG. 6 is a cross sectional view of a modification of the structure shown in FIGS. 4 and 5;

FIG. 7 is a right end view of the structure shown in FIG. 6;

FIG. 8 is a cross sectional view of a further modification of the structures shown in FIGS. 4 through 7;

FIG. 9 is a right end view of the structure shown in FIG. 8;

FIG. 10 illustrates a cross sectional view partly in elevation of a further modification of the structures shown in FIGS. 1–9 wherein the adaptor is fitted into the end of a flashlight casing;

FIG. 11 is a right end view of the structure shown in FIG. 10; and

FIG. 12 is a side view of the adaptor mounted on a fishing pole.

Referring more particularly to the drawing by characters of reference wherein the same reference characters are used for like parts in the several figures, FIG. 1 discloses a conventional fishing rod clamp or holder 13 for fastening to the side of a boat or other support for holding and supporting the reel end of a fishing rod or pole 14 having a fishing reel 15 attached thereto. A fishing line 16 is connected to the reel at one end thereof and is wound therearound and extends therefrom through a signalling device 17 clamped to holder 13. The pole holder 13, pole 14, reel 15 and line 16 are of conventional construction and are shown merely to illustrate the application of the signalling device.

FIG. 2 is an enlarged partial view of the signalling device 17 shown in FIG. 1 which will be explained more fully hereinafter. This illustration shows by the positioning of the fishing line that the fishing pole 14 and line 16 may be readily disengaged from the signalling device 17 by merely lifting the pole substantially vertically out of the pole holder 13. This action can occur without delay so that the fish biting at the end of the line may be caught.

FIG. 3 illustrates the signalling device 17 connected to a trolley type fishing mechanism 34. Trolley mechanism 34 comprises an upright 35 having clamped thereto and extending horizontally therefrom an arm 36. At the upper end of upright 35 is arranged an eyelet 37 for securing one end of a trolley line 38. The other end of trolley line 38 is anchored out in the water. A carriage 39 is mounted on line 38 and is arranged to move therealong. A fishing line 40 is connected along its length to the signalling device 17 mounted on arm 36. As the carriage moves along trolley line 38 to its anchored end in the water, fishing line 40 and hooks 41 are taken along with it.

The signalling device 17 comprises a battery casing 43 which may be, for example, tubular in shape and is adapted to contain a battery cell or cells. At one end of the battery casing is arranged a signalling element which may be a small electric lamp (not shown) enclosed by a translucent cover member 44. The lamp is biased away from electrical contact with the battery by a spring (not shown). At the other end of casing 43 is a switch contact 45 (shown in FIG. 6) which has an annular flange 46 arranged within the casing between the battery and the casing end and a substantially cylindrical portion 47 extending from the flange outwardly of casing 43. Contact 45 is held in electrical contact with the battery in casing 43 by the spring arranged at the lamp end of the casing. Upon inward movement of contact 45 the lamp is brought into electrical contact with the battery. The parts of the signalling device and their operation are well known in the art and form one of the known flashlight structures sold in the market place.

Casing 43 may be attached to the pole holder 13 of FIG. 1 and the trolley mechanism 34 of FIG. 3 in various ways but is shown as being fixedly attached to these structures by a suitable clamp 48 which is adapted to embrace casing 43 and to be fastened to each of holder 13 and the trolley mechanism 34 in a suitable manner.

In accordance with the invention a new and improved adaptor 50 is provided for connecting the signalling device 17 in working arrangement with the fishing line. Adaptor 50 shown in FIGS. 1–5 comprises a cylindrical member or housing 51, hollow at one end 52 for receiving the switch end of the tubular battery casing 43. The other end 53 of housing 51 is provided with a passageway or slot 56 extending transversely across housing 51 and communicates at least at a point along the slot's length with the hollow end 52 thereof. Although the housing may vary in length it may be less than one inch in length but more than one-half inch in length having a diameter less than its length. Another satisfactory size of housing 51 may be one wherein its diameter is substantially equal to its length. It is intended that housing 51 be arranged adjacent and/or fitted over only the switch end of a small battery casing so that the adaptor may be handled easily and readily carried in the fishing box or pocket of the fisherman.

A pin 54 is mounted in end 53 of housing 51 and arranged so as to extend across slot 56. A lever arm 57 is pivotally mounted on pin 54 and arranged at one end to engage the battery at the switch end of the battery casing 43 within the hollow end 52 of adaptor 50. As shown in FIG. 4 the switch mechanism 45 of FIG. 6 comprising the annular flange 46 and cylindrical portion 47 have been removed from the battery casing 43. Lever arm 57 at its battery engaging end contacts the battery directly and moves it into contact with the lamp at the other end of the battery casing. Lever arm 57 is mounted within and longitudinally of slot 56. At its other end it extends out of slot 56 so as to engage a fishing line or any other signal actuating means. Adaptor 50 is clamped onto the battery casing 43 by a suitable set screw 60 threadedly arranged in housing 51 in the usual manner.

As shown in FIGS. 4 and 5, lever arm 57 may be provided at the switch engaging end thereof with a finger 61 curved so as to extend through the opening of slot 56 into the hollow end 52 of housing 51 to engage the battery in the switch end of the battery casing 43. The end of lever arm 57 extending out of slot 56 is provided with a line guiding curl 62 for encircling the fishing line.

Lever arm 57 is rotated counterclockwise as shown in FIG. 4 to rotate finger 61 into switch engaging position with the battery in battery casing 43 thereby completing the electrical circuit through the electric lamp. A spring biasing means 63 is provided for controlling the movement of lever arm 57 in the said counterclockwise direction. In FIGS. 4, 6, and 8 this biasing means is provided with a coil spring 64 fixedly attached at one end 65 to a bolt 66. The free end of spring 64 is arranged for engaging lever arm 57 and biasing it against movement in said counterclockwise direction. The biasing effect of spring 64 may be varied by axial movement of bolt 66 inwardly or outwardly of housing 51. Bolt 66 is threadedly arranged in housing 51.

As shown in FIGS. 1 and 3 fishing lines 16 and 40 are threaded through guiding curl 62 at the end of lever arm 57 to the fishing tackle arranged at the hook end of the line. This curl holds the line to the signalling device. When a fish strikes the hook end of the line, the line is jerked or pulled taut or straight resulting in rotating lever arm 57 against the biasing effect of spring 64. Rotation of lever arm 57 against the biasing effect of spring 64 causes finger 61 thereof to force the battery in the casing 43 into the casing and the terminal of the battery into engagement with the base contact of the electric lamp in the usual manner. This action completes the electric battery circuit through the metal casing 43 and the lamp which lights the lamp and indicates to the fisherman that the fish is hooked. Contact 45 of the signalling device shown in FIG. 6 and the battery itself shown in FIG. 4 are pressed inwardly of the casing to contact the lamp against the force of the battery spring (not shown) which normally holds the plunger contact 45 and the battery in open circuit position. As explained above the sensitiveness of the triggering lever arm 57 is adjusted or set by threadedly adjusting the position of bolt 66 in housing 51.

As shown in FIGS. 1 and 2 if the curl 62 is arranged to one side of the body of the adaptor in a substantially horizontal position and a pin 67 is arranged to protrude out of the top of the adaptor, as shown, the line from reel 15 may pass partly around pin 67 and into and through curl 62. The line arranged in such a manner pulls the lever arm 57 toward the hook end of the line when tugged on by a fish. As shown in the broken line position of line 16 in FIG. 2, the line may be readily disengaged from the adaptor by merely lifting upon the pole. The line passes over pin 67 and out of curl 62 with little or no restrictions. This can be done without delay and without causing a slack line so that a fish on the end of the line is subjected to a taut line even during the disengaging operation.

FIGS. 6 and 7 illustrate a modification of the structure shown in FIGS. 4 and 5 wherein pin 54a supporting lever arm 57a extends through housing 51a of adaptor 50a and is provided with a curl 70 at its outer end for holding the line outwardly of the signalling device. Because of the battery casing's switch end herein containing the protruding cylindrical portion 47 which extends through an opening 71 in housing 51a into the slot 56a, the finger 61 of lever arm 57 shown in FIGS. 4 and 5 is omitted.

FIGS. 8 and 9 illustrate a further modification of the structures shown in FIGS. 4 and 5 wherein lever arm 57b is mounted on pin 54b in the same manner, but a further pin 73 is inserted in housing 51b and provided with a curl 72 at its outer end for holding the fishing line away from the housing.

FIGS. 10 and 11 illustrate a variation of the structure shown in FIGS. 4, 5, 8 and 9 wherein a flashlight casing 74 serves as a housing for receiving adaptor 50c. Lever arm 57c extends through the housing 51c but is arranged in the adaptor in the same manner as described for FIGS. 8 and 9. In place of the spring biasing means 63 of FIGS. 1–9 the structure shown in FIGS. 10 and 11 utilizes a sleeve 75 and spring 76 for the lever arm biasing means. Sleeve 75 is arranged to operate over and on the surface of the flashlight casing 74. Spring 76 is fixedly attached at one end to lever arm 57c and at the other end to sleeve 75 for biasing the lever arm toward the sleeve. The biasing effect of spring 76 on lever arm 57c is determined by the particular position of sleeve 75 on casing 74. Sleeve 75 when positioned at a given place on casing 74 is retained there by the force of spring 76 which binds sleeve 75 to casing 74 by pulling sleeve 75 toward lever arm 57 at one point only along its outer periphery. This binding action is sufficient to retain sleeve 75 relatively fixed on casing 74 but at the same time makes its relatively simple for an operator to move the sleeve readily to another position to vary the sensitiveness of the signalling device.

The disclosed and claimed adaptor is provided so that the movable lever arm 57c is arranged in a slot formed in one end of the adaptor housing. The switch actuating end of arm 57c and its pivotal connection to pin 54c is arranged within the housing and particularly slot 56c. By this arrangement the pivotal connection and switch actuating end of the adaptor are protected from the wind and other outside influences that might effect the sensitiveness of the adaptor, signalling device combination.

FIG. 12 illustrates the manner in which the adaptor is attached to a fishing pole such as a casting rod. As readily noted the adaptor may be placed at any given position along the length of the rod.

Although the signalling device has been shown and described as associated with a flashlight structure, it is intended to be within the scope of this invention to use any other form of signalling device therewith such as a buzzer or bell.

Various modifications and changes in the precise construction and arrangement of the parts forming the invention are contemplated and may obviously be resorted to, and the right is therefore expressedly reserved to make such modifications and changes as do not depart from the spirit and scope of the invention as hereinafter defined by the appended claim. It is understood that the parts of the claimed structure may be formed out of any type of material such as metal, plastic, or any combination thereof and the parts may be machined, molded or fabricated in any way and in any number of parts or combination.

What I claim is:

An adaptor for connecting a signal device having an actuating member extending from one end thereof to a fishing line comprising a cylindrical housing, said housing having a first passageway extending axially therethrough, said first passageway at one end of said housing being enlarged, said housing having a transverse passageway extending therethrough and communicating with said first passageway, a pin arranged to extend through the other end of said housing and said transverse passageway and out one side of said housing transversely to the longitudinal axis of said housing, said pin outside of said housing being provided with a fish line engaging means, a lever arm pivotally mounted on said pin within said transverse passageway and arranged to extend longitudinally of said transverse passageway, said lever arm being formed to provide an actuating member engaging portion at one end thereof within said transverse passageway, the other end of said lever arm being actuatable in one direction to rotate said actuating member engaging portion, an adjustable tension means having one end engaging said lever arm and the other end anchored to said housing, and means for attaching the adaptor to the signal device whereby the signal device may be positioned in said enlarged end of said passageway with said actuating member being in contact with said actuating member engaging portion so that when the fish line is attached to said lever arm and said fish line engaging means and pulled thereon causes rotation of said lever arm.

References Cited by the Examiner

UNITED STATES PATENTS

| | | | |
|---|---|---|---|
| 963,654 | 7/10 | Schindler | 43—17 |
| 1,309,365 | 7/19 | Monighan | 43—17 |
| 1,337,292 | 4/20 | Timmons | 43—17 |
| 2,454,896 | 11/48 | Traub | 43—17 X |
| 2,490,669 | 12/49 | Burke | 43—17 |
| 2,518,517 | 8/50 | Baulski | 43—16 |
| 2,574,333 | 11/51 | Kuczynski et al. | 43—17 |
| 2,619,559 | 11/52 | Schenkel | 43—17 X |
| 2,680,842 | 6/54 | Opphile | 43—17 X |
| 2,834,140 | 5/58 | Knier | 43—17 |
| 2,973,599 | 3/61 | Olson | 43—17 |
| 2,978,828 | 4/61 | McQuiston et al. | 43—17 |
| 3,063,185 | 11/62 | Dinger | 43—17 |

ABRAHAM G. STONE, *Primary Examiner.*

SAMUEL KOREN, JOSEPH S. REICH, *Examiners.*